even though the invention is not limited to reinforcements of this type are formed from fibrous glass.

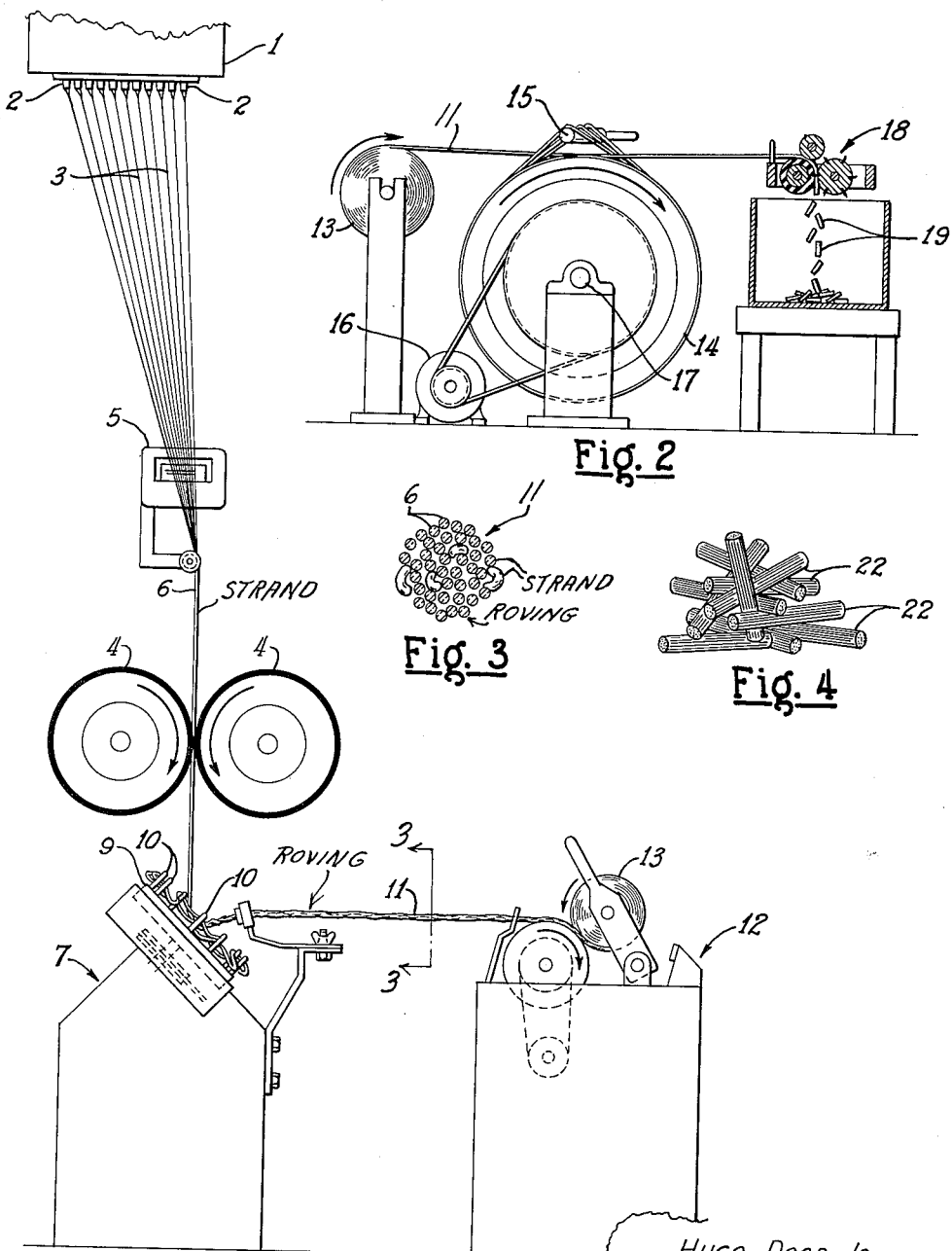

3,220,905
METHOD OF PREPARING FIBROUS GLASS REINFORCEMENTS

Hugo Doob, Jr., Providence, Thomas E. Philipps, Cumberland, and Gustav E. Benson, Greenville, R.I., assignors to Owens-Corning Fiberglas Corporation, a corporation of Delaware
Filed June 8, 1960, Ser. No. 34,842
7 Claims. (Cl. 156—180)

The present invention relates to reinforcements for plastic materials and particularly to reinforcements of this type which are formed from fibrous glass.

With the advent of the widespread employment of fibrous reinforcements for plastic materials such as synthetic resins, glass in fibrous form has obtained a predominant position among the applicable materials devoted to such usage. Its popularity in this function is the direct result of the high tensile strengths of the glass fibers and the corresponding reinforcement values stemming from these strengths. Its desirability is enhanced by comparison with defects in the form of undesirable water absorption characteristics and low strengths which occur in alternate materials such as sisal.

However, the over-all desirability of fibrous glass reinforcements is considerably diminished particularly in premixes as a result of the poorer distribution characteristics of such materials. These characteristics result in aesthetic, processing and strength detriments as manifested by the presence of surface ripples, knit lines, the clogging of equipment and the failure to achieve uniform structural strengths as a direct result of the poorer flow qualities of resins containing fibrous glass reinforcements and the inability of such reinforcements to be uniformly dispersed throughout the matrix which is to be reinforced. In addition to detractions from the appearance of objects formed from glass fiber reinforced resin premixes, a more serious hazard in the form of poor structural strengths is encountered as a result of the uneven distribution of the reinforcing elements. This aspect stems from a "weakest link in the chain" condition wherein non-reinforced areas resulting from uneven distribution of the reinforcements break more readily than structures provided with a uniformly dispersed fibrous material which has much lower strengths than glass fibers.

Thus, despite certain drawbacks, weaker reinforcing materials such as sisal, with its highly undesirable water absorption characteristics, are often selected in preference to glass fibers in view of the uniform distribution achieved within such weaker sisal monofilaments with attendant strength uniformity and freedom from aesthetic detriments.

The poorer distribution characteristics of fibrous glass materials stem from the fact that such materials are of a more fibrous and less integral nature than equivalent reinforcements such as sisal. Due to the multiplicity of filamentary projections present in these highly fibrous materials, entanglements are at a maximum with an attendant aggregation or colonization resulting among the reinforcing elements. Such entanglements thus prevent the uniform distribution of the fibers and this resistance to dispersion is considerably enhanced when the fibers are mixed into a viscous medium such as a resin. In addition to strength decreases caused by the non-uniform distribution of the entangled fibers, the appearance of structures formed therefrom is also diminished or detracted from, since the entanglements impair the flow characteristics of the medium in which they are entrained to cause surface ripples and prominent knit lines. The latter demark the juncture of separated flow segments upon their reunion. Such entanglements provide further impairments in the form of fibers visible at the surfaces of the resin structure as the result of fiber build-up upon entanglement.

The highly fibrous, entanglement conducive condition of fibrous glass reinforcements accompanies their utilization despite the fact that they are conventionally employed in the form of structures which comprise a grouped plurality of fibers or filaments such as a strand or yarn, as opposed to a form wherein individual or separate filaments are incorporated in the matrix to be reinforced. Conventionally, the reinforcements are utilized in the form of a chopped roving. Particularly useful are spun rovings such as are disclosed by U.S. 2,719,350, 2,719,352 and 2,719,926. Such spun roving, which is chopped to provide short links of the reinforcing elements, is a yarn-like structure wherein an individual strand made up of a plurality of glass filaments is doubled and redoubled upon itself to form an elongate structure comprising a plurality of strands built up and grouped by the doubling action. Such rovings are greatly preferred due to the fact that a greater number of reinforcing elements or strand rodlets are produced simultaneously from a single treated unit as opposed to a single strand material wherein a number of strand ends would have to be utilized in order to provide a corresponding number of rodlets.

Thus, the reinforcing elements normally employed comprise short lengths of strand which embody a plurality of individual filaments. The strand structure is conventionally maintained during the processing and chopping of the roving by means of a size composition applied during fiber formation and containing as a principal ingredient, a film-forming binder material which serves to bond the individual fibers into a strand structure and to provide an abrasion resistant sheath. However, it has been found that the integrity maintained by the size or binder does not withstand the rigors of the chopping operation, admixture with the resin and the conduct of the molding operation. During chopping, the ends of the rodlets or reinforcing elements are frayed to produce an entanglement conducive condition and the agitation occasioned by admixing the rodlets and resin and by the restricted flow encountered in mold gates and necked chambers yields rodlets with projecting filaments as well as individual fibers resulting from rodlet breakdown. The described frayed ends, projecting filaments and individual fibers combine to provide a reinforcing medium which is highly prone to entanglement with attendant aggregate formation and flow and distribution impairment. This defect detracts not only from the uniformity of the strengths of structures containing such reinforcements and from the appearance of such structures, but also from the over-all degree of reinforcement which may be imparted since a greater proportion of reinforcing elements may be incorporated within a given volume without damage due to mutual abrasion when such elements are provided in an integral, compact form. In addition, if the reinforcing elements or rodlets possess sufficient integrity to withstand extensive working during admixture with the resin, a greater degree of wetting out of the reinforcements by the resin and an attendant strength increase is achieved.

It is an object of the present invention to provide fibrous glass reinforcements for plastic materials which embody a plurality of glass filaments of short length in an integral, rod-like form.

A further object is the provision of fibrous glass reinforcements which may be readily dispersed throughout a plastic matrix.

Another object is the provision of a method for the prepartion of fibrous glass reinforcements for plastic materials.

An additional object is the provision of a resinous molding premix which contains uniformly dispersed, integral fibrous glass reinforcements.

In considering the process and materials embodying the invention, the term "strand" is employed to designate a plurality of glass filaments associated together in a parallel or generally parallel relationship to form what might be termed groups or bundles of filaments, or threads or yarns formed from filaments or groups of filaments while the term "roving" connotes an elongate fibrous glass structure comprising a plurality of strands or strand segments in a parallel or generally parallel relationship.

The aforegoing objects of the present invention are achieved by providing a reinforcing element which comprises a plurality of short glass fiber in parallel relationship which are united into a rod-like structure by means of a resinous binder which comprises at least 2% by weight of the composite resin-fiber structure. Such structures are prepared by applying a binder to the fibers during their formation by attenuation, grouping a plurality of the fibers into a strand or roving formation, retarding the drying of the binder, subjecting the fibers to a simultaneous drying, curing and working operation and chopping the fibers into segments of the desired length. As a result, high strength reinforcing elements or rodlets having the dispersibility of fibrous bundles such as sisal are obtained.

More specific objects and advantages of the invention will be better understood in reference to the following specification and to the attached drawings.

FIGURE 1 is a diagrammatic drawing of apparatus by which the fiber forming, attenuating, coating, strand forming, roving forming and package winding steps of the operation are conducted with certain parts being shown fragmentarily and others shown in section.

FIGURE 2 is an end view of the rotating drum or angle-axis dryer and chopping apparatus which are employed in drying, curing, working and chopping the treated materials prepared upon the apparatus of FIGURE 1.

FIGURE 3 is an enlarged cross-sectional view of a roving formed from fibrous glass and taken through plane 3—3 of FIGURE 1.

FIGURE 4 is an enlarged view in elevation of a plurality of the reinforcing elements of the invention.

As previously stated, it was determined that both the nonuniform strength characteristics and aesthetic detriments which characterize resinous structures reinforced with fibrous glass in which a plurality of reinforcements are admixed with the resin, are caused by the lack of integrity exhibited by the reinforcements which in turn gives rise to entanglements and dispersion impairment. Since the basic integrity of the fibrous strands is achieved by means of a binder, it was first decided to increase such integrity via the binder, to the extent that it would withstand the rigors of chopping, admixture with the resin and of flow and processing conditions during molding and the like.

In a first approach, stronger binder materials were employed in conventional quantities. Selected for strength characteristics were resins such as polyesters, modified polyesters, phenolics, alkyds, modified alkyds, epoxies, acrylics, butadiene-styrene copolymers, melamines and the like. However, it was found that the substitution of equal quantities of stronger resins still failed to produce an adequate integrity. As a result, larger quantities of the stronger binders were restorted to. While this remedy yielded the desired integrity, it was found that the production of the high integrity reinforcing elements defied reduction to a practical commercial process. When fibrous rovings conventionally employed in reinforcement fabrication were treated with quantities of the high strength resins in excess of 2% by weight of the resin-fiber composite, the bunched or grouped strands embodied in the roving were cemented together to provide clumps or aggregates of such a size that their processing in a plastic matrix was rendered more difficult than that of conventional reinforcements and a poorer product was derived. In addition, the wound packages of roving thus treated formed a cemented or integral structure which precluded the removal of the roving. When single strands were similarly treated, the same package cementing occurred and the process was greatly complicated by the necessity for processing a plurality of strand ends in order to produce the quantity of reinforcing elements which could be prepared from a single roving. In addition, both the roving and single strand products were characterized by the previously mentioned undesirable aggregates which proved as highly detrimental as the entanglements of the conventional product.

As a solution, spun rovings are formed from continuous fibrous glass strands which are coated with an amount of resinous binder in excess of 2% by weight of the resin-fiber composite and the drying of the thus treated roving is prevented until a simultaneous working, drying and curing can be effected.

The simultaneous working, drying and curing are achieved by means of a heated drum about which the roving and strand is passed, as will be described in more detail hereafter.

The dry roving is then chopped into short lengths to provide a plurality of integral strand segments. This is possible since the working action effected during drying and curing prevents substantially the interbonding of the strands embodied in the roving or the intra-roving bonding while maintaining substantial strand integrity and thus providing strand segments readily separable to provide the desired rod-like reinforcing elements.

The two major phases of the process of the invention are illustrated by FIGURES 1 and 2.

FIGURE 1 depicts the fiber formation, coating, roving forming and winding phases wherein 1 designates a heated bushing containing molten glass which flows through tips 2 which are provided with orifices, to form filaments 3 which are attenuated by pull wheels 4. Between the bushing 2 and the pull wheels 4, the fibers are coated by means of apparatus 5 which is illustrated as an apron type applicator, but which may optionally comprise other contact immersion, or spray devices such as rollers, pads, jets, baths or the like.

At this point the binder coated strand 6 may be subjected directly to the working-drying operation of FIGURE 2 or may be formed into a roving by means such as those illustrated generally at 7 in FIGURE 1.

In the apparatus depicted at 7, the strand 6 is protected downwardly into the path of a rotary pegged spinner which comprises a rotatably mounted disk 9 provided with a plurality of pegs 10 which are evenly spaced about its periphery. These pegs 10 serve to entangle or loop the strand and thereby form a roving 11 which is withdrawn by means of winding apparatus 12 to form a wound package 13 of the roving.

While FIGURE 1 depicts the pegged disk type of roving former, the strand need not be formed into a roving or if a roving is desired, other roving forming apparatus such as rotating annuli, vaned spinners and the like may be employed.

The roving 11 is then either immediately subjected to an immediate working and heating or is maintained in an undried, uncured condition until such time as a later described simultaneous working, drying and curing step may be conducted prior to chopping. The maintaining of the strand or roving in the aforementioned undried state may be readily achieved by means of controlled humidity chambers, the utilization of humectants or the like, although the preferred method of retarding drying and curing comprises the storage of the wound package of coated fibers in a vapor impermeable structure such as a polyethylene bag.

Subsequently, the roving 11 is introduced to the working, drying, curing and chopping action of the apparatus illustrated in FIGURE 2. In this operation, the wound packing 13 is removed from the drying retarding means and the roving 11 is wound about the surface of a heated drum 14. The time of treatment necessary for the desired degree of working, drying, and curing is controlled by means of the number of turns of the strand which are taken about the drum 14 with an increased number of turns yielding an increase in the treatment time. In order to advance the strand across the drum surface, a canted roller or auxiliary idler 15 of a relatively small diameter is mounted in a horizontal plane parallel to the axis of the heated drum 14, with its axis at an angle to the axis of the heated drum. By looping the strand about the drum and roller, the strand is subjected to the heat of the drum as the strand is progressively advanced across the drum surface and ultimately withdrawn.

The drum may be heated by any conventional means including the positioning of heating means within the drum, although it is preferred to circulate a fluid heating medium such as steam or heated liquids in contact with the inner-surface of the drum. The drum 14 may also be rotated by any conventional means such as variable drive means 16 which drive an axle 17 protecting from the axis of the drum 14.

In some instances, it is desirable to continue the concurrent working and heating only until the resinous binder achieves a dried state. This approach yields a product which exhibits unusually good wetting out characteristics when a resinous coating or matrix is superimposed. This is due to the fact that an uncured resin is more thoroughly and rapidly wet-out by a superimposed resin than is a completely cured resin base. However, this approach entails a decrease in strand integrity, as compared to a completely cured binder, and should be avoided when the fibrous glass base material is to be subjected to a rigorous treatment as in the case of the preparation of glass fiber reinforced molding pre-mixes. However, in other cases wherein an enhanced ability to be wet-out takes precedence over the integrity of the fibrous structure, the strand or roving may be treated until such time as the resinous binder is dried but uncured.

Since the extent of the treatment accorded the fibrous glass strand or roving is a function of the temperature of the drum, the drum diameter, the number of turns or loops of the strand or roving which are placed about the drum, and the speed at which the strand travels, these factors may be manipulated to control the extent of said treatment. Accordingly, the achievement of a dried but uncured state may be achieved by decreasing any of these factors except the strand speed, which must be increased to decrease the treatment. Alternatively, a complete curing of the resinous binder may be accomplished by decreasing the strand speed or increasing the other factors.

In addition, the running or longitudinal motion of the strand may be achieved by a variety of means. As shown in FIGURE 2, the strand may be drawn or pulled by driven rollers provided upon the chopper 18 or similar pull wheels or rollers may be inserted at other points along the strand path to bring about the mobilization of the strand.

In one embodiment, rovings coated with a polyester based binder were treated at a rate of approximately 300 feet per minute by employing a drum having a diameter of 8 inches which is heated to 575° F. and passing 50 turns of the roving about the drum. In another embodiment, the number of turns was reduced and two rovings were treated simultaneously by employing a drum having a larger diameter.

The apparatus just described is not limited to the treatment of a single strand or roving. By feeding a strand to the input end of the drum and roller and withdrawing it after the number of required turns are made, and introducing a second strand adjacent to the point of withdrawal of the first strand, a number of strands limited only by the length of the drum and the number of turns required for treating, can be simultaneously treated. Alternatively, a plurality of roving ends may be introduced as a narrow band and this band wound about the drum.

The dried, cured and worked roving 11 is then led from the heated drum to a chopper 18 which serves to chop the roving 11 into roving segments 19 of the desired length with each roving segment 19 containing a plurality of rodlets or short discontinuous segments of the continuous strand 6, which are subsequently shown and discussed in respect to FIGURE 4. Although any conventional chopping apparatus may be utilized, a roller type chopper as disclosed by U.S. 2,719,336 is preferred. While the length of the chopped roving segments 19 is dependent upon the ultimate use for which they are intended, it has been found that for use in resin premixes a length of 1 inch or less is preferred with ¼–½ inch segments providing an optimum product. The chopped roving segments 19 provided by the process and directly yielded by the chopping step each comprise a plurality of rodlets as shown in FIGURE 4 with each rodlet formed of a plurality of glass filaments maintained in an integral state by means of a binder and with each rodlet actually comprising a short or discontinuous section of the continuous strand 6. The same rodlet form is derived regardless of whether the treated material comprises a strand or roving since the post-forming retardation of drying in combination with the simultaneous working and drying achieved by the heated drum apparatus serve to maintain intra-strand integrity while preventing inter-strand or intra-roving bonding.

FIGURE 3 depicts a cross-section of a fibrous glass roving 11 taken through plane 3—3 in FIGURE 1 which is employed in a preferred embodiment of the invention. In the drawing, a cross-section of the roving 11 is shown and it may be seen that the roving is made up of a plurality of segments of the continuous strand 6 which normally are present in excess of 20 in number and often totalling 60 or more, dependent upon the type of roving formation method which is employed. Each segment of the strand 6 comprises a plurality of glass filaments, the number of which is dependent upon the number of bushing tips 2 which are provided in the bushing 1 illustrated in FIGURE 1. It should be noted that the cross-sectional view of the roving 11 which is shown in FIGURE 3, is substantially the same as an end view of the elongate roving segments 19 of FIGURE 2, since the cutting action of the chopper 18 actually "cross-sections" the roving 11. However, the roving segment 19 is a transitory form since these segments separate into the rodlets depicted in FIGURE 4 with each rodlet comprising a short section of the strand 6.

The reinforcing rodlets 22 which are derived from the strand 6 as it is chopped while in the form of the roving 11 are illustrated in FIGURE 4 and each comprises an elongate section of the strand 6. FIGURE 4 actually represents the dispersed or discrete rodlets 22 of a roving segment 19, such as is shown in FIGURE 2, and graphically illustrates that upon chopping the adjacent contacting segments of the strand 6 separate to yield individual rodlets 22, rather than retaining the form of the roving segment 19. Such separation of the rodlets 22 is achieved by means of the concurrent working and curing of the roving 11 while segments of the strand 6 are in intimate engagement as shown in FIGURE 3. As a result of such working the segments of the strand are not permitted to remain in prolonged engagement or contact during the curing phase, i.e. they are continually shifted in relation to one another, and consequently such segments do not adhere to one another through the medium of the cured binder, with the result that upon chopping, when the continuous strand is converted to short rodlets, the rodlets readily separate from one another. The plural filament rodlets are maintained in the rodlet 2 form as the result of the bonding effect of the binder which is applied at forming as depicted at 5 in FIGURE 1 and cured and dried upon the heated drum 14 of FIGURE 2, While the previously described polyester, modified polyester, phenolic, epoxy, alkyd, modified alkyd, acrylic and melamine resins as well as various copolymers such as butadiene-styrene copolymers are all generally applicable to the treatment of the invention, polyesters have exhibited unusually good performance. A preferred formulation comprises the following ingredients expressed in percentages by weight:

Selectron 5930 polyester resin _____ 20.0
Vinyl tris beta methoxy ethoxy silane _____ 0.4
Benzoyl peroxide catalyst (applied as 50% paste in tricresyl phosphate) _____ 0.4
Water _____ Remainder The vinyl silane is employed as a coupling agent to enhance resin-glass bonding. Selectron 5930 is a polyester resin prepared by Pittsburgh Plate Glass, while the benzoyl peroxide catalyst applied is a commercial preparation designated Luperco ATC which is manufactured by the Lucidol Division of Wallace & Tiernan, Inc.

As previously stated, the binder is employed in quantities which will leave a deposit of 2% or more by weight of the binder-fiber composite with a preferred binder content comprising 3–5% by weight of the composite.

As a result of the utilization of the materials and methods of the invention as described herein and depicted in the attached drawings, discrete short rodlets formed from a continuous fibrous glass strand and comprising a plurality of bonded glass filaments may be formed from a plurality of said strands, or a plurality of segments of a single strand, which are in the engaging, substantially parallel relationship, and which are impregnated with an uncured binder. In addition, a processable product coated with a resinous binder amounting to 2% or more by weight of the binder-fiber composite may be applied in a continuous commercial process without the hazards of intra-package bonding or the formation of aggregates of rodlets while the discrete rodlets thus obtained maintain their integrity and resist the separation of the individual filaments during rigorous treatments, with the result that the rodlets are capable of uniform distribution throughout a plastic material such as a resin. Also, the process provides a method for simultaneously working, drying, curing and chopping the treated strands or rovings without the delay and expense entailed in a separate curing and repackaging of the treated product.

The unfeasibility of preparing the product of the invention by conventional means or the fabrication of an acceptable product by such means is demonstrated by the following data wherein a number of rovings bearing equivalent amounts of the same binder material were subjected to a variety of drying and curing methods:

*Example I*

Four wet forming packages of spun roving which bore coatings comprising 2.4, 3.5, 4.2 and 5.9% by weight of binder solids were subjected to the treatment of the present invention and chopped into lengths of approximately ¼ inch. The products thus prepared were uniform in appearance despite the broad resin content range and had a shiny, silvery-white appearance. The existence of large white clumps or aggregates of inter-bonded strands or rodlets was extremely limited and the separation of the rodlets from the combined strand of the roving form was substantially complete. While small aggregates comprising 2–4 united strand segments were observed, these separated immediately upon the application of the slight force engendered by rubbing the aggregates gently between a thumb and forefinger. However, even somewhat prolonged rubbing of this nature failed to break down the integral rodlets in the single strand form. The samples of this example were coated with the previously described resin formulation which has a polyester (Selectron 5930) base and were cured with 55 turns about a drum heated to 590° F. at a rate of 296 feet per minute.

*Example II*

Four identical samples bearing the same quantity of the resin binder employed in Example I were prepared by oven drying and curing with forced air at 500° F. for three minutes, 1 yard lengths of the same wet packages of spun roving which were employed in Example I. The 1 yard lengths of the roving were employed of necessity, since previous attempts proved that drying and curing of the roving at 500° F. while in package form brought about a solid, bonded package from which the roving could not be unwound. The four samples thus prepared exhibited a uniformly yellowish-brown hue and were characterized in all instances after chopping by an abundance of large aggregates of united or bonded strand segments. These aggregates resembled segments cut from wood shavings and the plurality of strands embodied therein were barely distinguishable. In addition, excessive rubbing was required to separate the aggregates and upon separation individual glass filaments, and strand segments with frayed ends or projecting filaments were yielded. As opposed to Example I wherein aggregates were the rare exception, the majority of the structures of the present example comprised aggregates of a size much greater than any encountered in Example I. The presence of aggregates progressively advanced with the increase in binder content and the example containing 5.9% by weight of binder possessed almost no individual strand segments.

*Example III*

The test conducted in Examples I and II was repeated with the substitution of air-oven curing. With this technique the sample containing the 5.9% binder could not be chopped due to the extremely tough and integral rovings structure which was produced. The remaining examples which were choppable, yielded aggregates having an equal breadth and width (¼ inch) with very few smaller aggregates or single strand segments. An additional run of the sample containing 3.5% binder was conducted in which the sample was subjected first to dielectric drying and then to an air oven cure. This expedient also yielded a majority of aggregates of an extremely large size.

*Example IV*

To further demonstrate the impractibility of conventional methods, even when combined with the angle-axis drying and working of the present invention, roving samples coated with 3.2% of the same binder employed in Examples I, II and III were dried in a dielectric oven. One sample was maintained in the state thus achieved and chopped, while a second portion was subjected to the drying, curing, working and chopping action of the invention. The first sample yielded a soft product possessing a majority of aggregates as opposed to single strand segments or rodlets. In addition, despite the aggregating effect, the product, upon application of very slight pressure broke down into single, entanglement conducive glass filaments. While the second portion possessed somewhat fewer aggregates, the same lack of integrity characterized by deterioration into single filaments was exhibited. This showing substantiates the necessity for cure retardation and a simultaneous drying and working.

The simultaneous working and drying employed in the invention is critical since other drying and curing methods which are not accompanied by working, result in an interbonding of the fibrous strands. The working or separation of the strands during drying enables strand drying without interbonding. While the angle-axis drum dryer is a preferred method of achieving the specified results, it should be noted that other techniques of securing simultaneous working, drying and curing may be employed. For example, the strand may be run through a tortuous path provided by staggered rollers or guide bars while heat is provided through the medium of elements positioned adjacent to or within the guide bars or rollers. Thus, the term "working" is employed to connote a moving of the treated material which could comprise bending, twisting, oscillating or the like. It should also be noted that in the absence of the combined drying retardation and subsequent simultaneous working and drying, a treated strand or roving would have to be maintained from the time of the application of the coating in a form wherein no segment of the treated strand would be in contact with another such segment. One may readily perceive the impracticality of such an expedient in the handling of large quantities of such material. In the case of a treated roving, even this impractical expedient would not suffice since the unavoidable contact of the individual strands which make up the roving would inevitably result in intra-roving bonding.

Molding premixes employing the products of the invention have readily demonstrated their efficacy. Tests have shown that despite the rigors of admixture of the reinforcements and resin, and conditions encountered during molding, the rodlets maintain their integrity to provide structures comprising grouped, parallel glass filaments which are substantially free from aggregate formation, frayed ends or projecting individual filaments. In addition, the examination of moldings formed from such premixes under strong light has shown that the reinforcements are uniformly distributed throughout the reinforced structure and that the structures are free from weak or unreinforced areas. A superficial examination of such molded structures also shows that surface ripple and knit lines which were formerly manifested by moldings embodying a chopped fibrous glass reinforcement are substantially deleted. This achievement is evidenced by the fact that rejects in commercial molding stemming from weaknesses and superficial defects were reduced from 30% to less than 5%, when the products of the invention were substituted for conventional low integrity fibrous glass rodlets.

Thus, it is evident that the invention provides new and unusual fibrous glass reinforcements, methods for the production of high integrity fibrous glass reinforcements and molding premixes characterized by the provision of molded structures having uniform strength and freedom from superficial aesthetic dertiments.

It is further apparent that various changes, alterations and substitutions may be made in the methods and products of the present invention without departing from the spirit of the invention as is defined by the following claims.

We claim:

1. A method for preparing fibrous glass reinforcements comprising applying a liquid resinous binder to glass fibers, grouping said glass fibers into a strand structure comprising a plurality of the glass fibers in a generally parallel relationship, forming said strand structure into a roving by grouping a plurality of strand segments in a generally parallel relationship, while said resinous binder is in an undried and uncured condition, subjecting said roving to a concurrent working and heating and chopping said roving to form chopped sections of said strand which have a length of no more than one inch.

2. A method as described in claim 1 in which said roving is wound into a package form in an undried and uncured condition following its formation and is withdrawn from said package form in an undried and uncured condition and immediately subjected to said concurrent working and heating and said chopping.

3. A method as described in claim 1 in which said concurrent working and heating is continued until said resinous binder is in a dried and uncured condition.

4. A method as described in claim 1 in which said concurrent working and heating is continued until said resinous binder is in a cured condition.

5. A method as claimed by claim 1 in which said strand segments are parallel segments of a single strand.

6. A method as claimed by claim 1 in which said strand segments are parallel segments of a plurality of said strand structures.

7. A method as claimed by claim 1 in which said concurrent working and heating is achieved by continuously passing said roving while under tension about the periphery of a heated rotating drum and continuously withdrawing said roving.

References Cited by the Examiner
UNITED STATES PATENTS

| | | | |
|---|---|---|---|
| 2,311,704 | 2/1943 | Simison | 210—205 |
| 2,719,350 | 10/1955 | Slayter et al. | 28—1 |
| 2,723,215 | 11/1955 | Biefeld et al. | 161—202 |
| 2,730,790 | 1/1956 | Rossin | 28—75 |
| 2,862,281 | 12/1958 | Klausner | 28—75 |
| 2,862,282 | 12/1958 | Beebe | 28—80 |
| 2,877,501 | 3/1959 | Bradt. | |
| 2,894,621 | 7/1959 | Ambrose. | |
| 2,903,779 | 9/1959 | Owens | 28—80 |
| 3,034,566 | 5/1962 | McKay | 156—441 |

EARL M. BERGERT, *Primary Examiner.*

R. C. MADER, ALEXANDER WYMAN, *Examiners.*